(12) United States Patent
Brandsma et al.

(10) Patent No.: US 6,926,631 B2
(45) Date of Patent: Aug. 9, 2005

(54) CONTINUOUSLY VARIABLE TRANSMISSION, ENDLESS FLEXIBLE BELT FOR TORQUE TRANSMISSION AND ADJUSTABLE PULLEY

(75) Inventors: Arjen Brandsma, Tilburg (NL); Paulus Maria Smeets, Tilburg (NL); Gerardus Johannes Maria Lamers, Nijmegen (NL)

(73) Assignee: Van Doorne's Transmissie B.V., Tilburg (NL)

( * ) Notice: Subject to any disclaimer, the term of this patent is extended or adjusted under 35 U.S.C. 154(b) by 120 days.

(21) Appl. No.: 10/276,855

(22) PCT Filed: May 23, 2001

(86) PCT No.: PCT/EP01/05921
§ 371 (c)(1),
(2), (4) Date: Nov. 20, 2002

(87) PCT Pub. No.: WO01/92763
PCT Pub. Date: Dec. 6, 2001

(65) Prior Publication Data
US 2003/0144097 A1 Jul. 31, 2003

(30) Foreign Application Priority Data
May 26, 2000 (EP) .............................................. 00201849

(51) Int. Cl.[7] .............................................. F16H 55/56
(52) U.S. Cl. .............................. 474/8; 474/17; 474/242
(58) Field of Search ................................. 474/8–13, 46, 474/69, 18, 28, 201, 242

(56) References Cited

U.S. PATENT DOCUMENTS 3,604,283 A 9/1971 Hubertus

FOREIGN PATENT DOCUMENTS

| DE | (1220693) | * 7/1966 | .................. 474/13 |
| DE | (3204059) A1 | * 8/1983 | .................... 474/8 |
| FR | (1351507) | * 12/1963 | .................. 474/13 |

OTHER PUBLICATIONS

Patent Abstracts of Japan, vol. 1997, No. 4, Apr. 30, 1997 & JP 08 326859 A (Suzuki Motor Corp), Dec. 10, 1996 abstract & JP 08 326859 A (Suzuki) Dec. 10, 1996 figure 4B.

(Continued)

Primary Examiner—Marcus Charles
(74) Attorney, Agent, or Firm—Young & Thompson

(57) ABSTRACT

A continuously variable transmission, provided with two adjustable pulleys, each pulley comprising a pair of mutually displaceable essentially frusto-conical pulley sheaves having a radial dimension provided on a pulley shaft, each sheave having a sheave face, whereby the sheave faces of a pulley are mutually oriented at a pulley angle, and with an endless flexible belt for transmitting torque comprising two lateral side faces, which are mutually oriented at a belt angle (alpha) such that the flexible belt tapers radially inwardly and which are intended for interacting with the sheave faces of a pulley under the influence of a clamping force to be exerted on the flexible belt by the sheaves. The belt angle is marginally, but notionally, larger than the pulley angle (beta) of at least one pulley for at least a substantial part of the radial dimension of the pulley sheaves.

20 Claims, 3 Drawing Sheets

OTHER PUBLICATIONS

Patent Abstracts of Japan, vol. 1999, No. 10, Aug. 31, 1999 & JP 11 125316 A (Mitsuboshi Belting Ltd), May 11, 1999 abstract & JP 11 125316 A (Mitsuboshi Belting) May 11, 1999 p. 2.

Patent Abstracts of Japan, vol. 008, No. 210 (M–328), Sep. 26, 1984 & JP 59 097354 A (Bandoo Kagaku KK), Jun 5, 1984 abstract.

Patent Abstracts of Japan, vol. 010, No. 253 (M–512), Aug. 29, 1986 & JP 61 082059 A (Honda Motor Co Ltd), Apr. 25, 1986 abstract.

Patent Abstracts of Japan, vol. 1995, No. 06, Jul. 31, 1995 & JP 07 083315 A (Aichi Mach Ind Co Ltd), Mar. 28, 1995 abstract & JP 07 083315 A (Aichi Mach) Mar. 28, 1995 figures.

Patent Abstracts of Japan, vol. 013, No. 577 (M–910), Dec. 20, 1989 & JP 01 242864 A (Toyota Autom Loom Works Ltd), Sep. 27, 1989 abstract & JP 01 242864 A (Toyota Autom Loom) Sep. 27, 1989 figure 1.

\* cited by examiner

FIG. 3
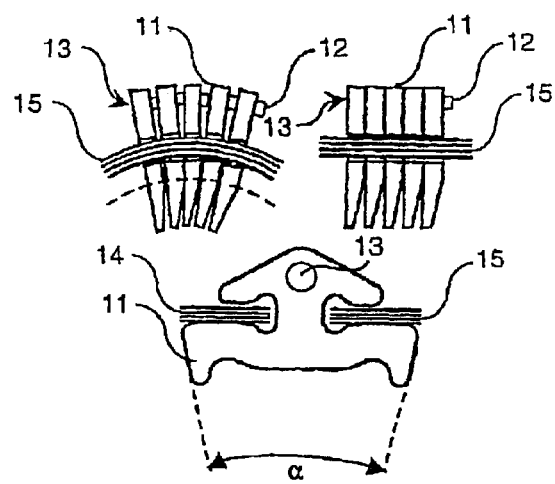
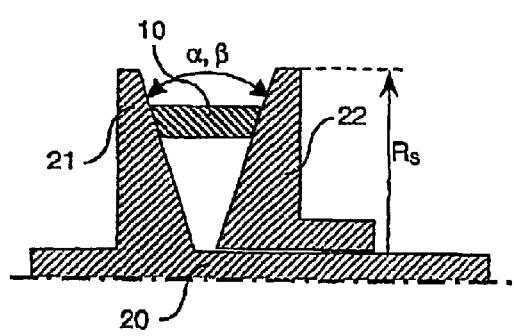
FIG. 4A
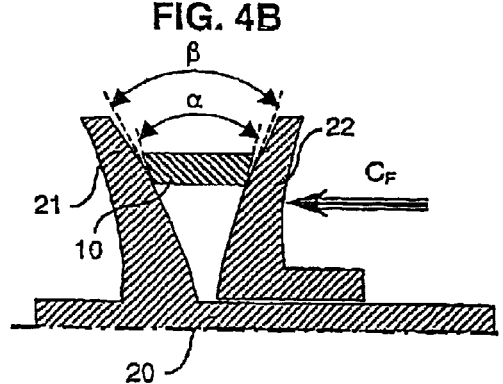
FIG. 4B
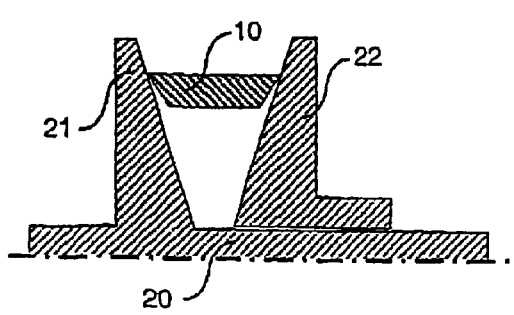
FIG. 5A
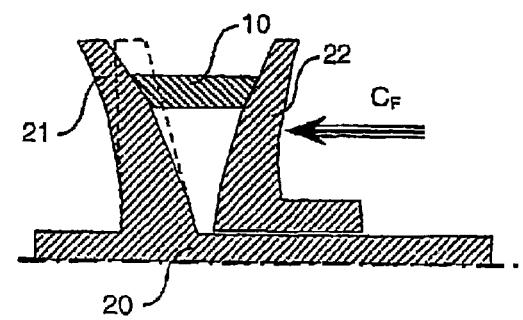
FIG. 5B

CONTINUOUSLY VARIABLE TRANSMISSION, ENDLESS FLEXIBLE BELT FOR TORQUE TRANSMISSION AND ADJUSTABLE PULLEY

CROSS REFERENCE TO RELATED APPLICATIONS

This patent results from a national stage of PCT/EP01/05921 filed May 23, 2001 and claims priority to European Application No. 00/201849.7 filed May 26, 2000.

BRIEF DESCRIPTION OF THE INVENTION

The present invention relates to a belt-type continuously variable transmission, alternatively denoted as a CVT, provided with an adjustable pulley and an endless flexible belt. The invention further relates to an endless flexible belt for torque transmission, such as a push-type drive belt, and to an adjustable pulley.

DESCRIPTION OF THE RELATED ART

The CVT of the present type is generally known, for example from EP-A-0.950.837, and comprises a first adjustable pulley, a second adjustable pulley and an endless flexible belt, such as a push-type drive belt known from EP-A-0.962.679, a chain and the like, for transmitting torque between the pulleys at a variable transmission ratio. In the known CVT, with the application of a clamping force, the flexible belt is clamped at a continuously variable radial position between the sheaves of a pulley. To this end, at least one sheave of a pulley is axially movable. The lateral side faces of the flexible belt, which are intended for interaction with the sheave faces of a pulley, are mutually oriented at a belt angle, such that the flexible belt tapers radially inward. The sheaves faces of a pulley, which are intended for interaction with the lateral side faces of the flexible belt, are mutually oriented at a pulley angle, such that together the sheave faces of a pulley define a V-shaped groove. The clamping force applied for each pulley may be such that a state of equilibrium arises, wherein a transmission ratio of the CVT that is defined as the ratio of radial positions of the interaction between the lateral side faces and the sheave faces is constant. Departing from such a state of equilibrium, the transmission ratio may be continuously variably changed by increasing respectively decreasing the clamping force for each pulley, whereby the radial position of the interaction between the lateral side faces and the sheave faces may be changed for each pulley.

In the known CVT, the pulley angle and the belt angle correspond, so as to maximise a contact area of the interaction and thus to realise a relatively low contact pressure there between. Additionally, an even distribution of the contact pressure is effected. Nevertheless, unevenly distributed wear of the lateral side faces and/or of the sheave faces may in some cases still be observed, which has an adverse influence on the service life of the CVT. Furthermore, local wear of other parts of the flexible belt may also be observed, the occurrence of which appears to correlate with the occurrence of the wear of the lateral side faces and/or of the sheaves. The latter phenomenon of local wear is particularly evident in a push-type drive belt, which comprises a number of transverse elements that are contiguously and slideably mounted on a carrier comprising at least one continuous band. The transverse elements of the push-type drive belt are provided with a projection and with a recess, whereby the projection of a transverse element interacts with the recess of an adjacent transverse element, such that the mutual movement of the elements is confined. With this type of flexible belt local wear may be observed at the location of the projection and of the recess.

SUMMARY OF THE INVENTION

It is the object of the present invention to provide for a CVT having an improved service life and, more in particular, to obviate the problems of unevenly distributed wear of the flexible belt and/or of the sheaves. According to the invention, this object may be achieved, surprisingly, in the continuously variable transmission, i.e. by a belt angle that is marginally, but notionally, larger than the pulley angle. Although, such measure appears to effect smaller contact area of the interaction between a lateral side face and a sheave face, or, taking into account elastic deformation of the flexible belt and pulley, at least a seemingly unfavourable and uneven distribution of the contact pressure, it is in fact surprisingly and advantageously found that the unevenly distributed wear is reduced. Moreover, the observed amount of local wear in case of the push-type drive belt is also reduced. It is hypothesised that such phenomenon are due to the fact that in the CVT according to the invention a slight increase in the pulley angle which is caused by a deformation of the sheaves of a pulley under the influence of a predominantly axially oriented reaction force exerted by the flexible belt on the sheaves at a radial position of the interaction. The amount of the deformation thereby depending on the level of the clamping force that causes the reaction force, as well as on the radial position of the interaction, since the thickness and thus the stiffness of the frusto-conical pulley sheaves decreases in radially outward direction and since the reaction force exerts a moment on the sheave the arm of which depends on the radial position. The invention thus takes account of the recognition that particularly the radially outer end of the sheaves may deflect relatively strongly, whereby the pulley angle is increased. Such deflection probably causes the flexible belt to be borne unstable, but is considered to be at least responsible for additional wear of the flexible belt. In the CVT according to the invention, the contact pressure on the lateral side faces of the flexible belt during operation is considerably more evenly distributed. Moreover, the measure can prevent that the contact pressure between sheaves and a lateral side face decreases in radially outward direction, which would cause an unstable configuration and could lead to deformation of the flexible belt. The phenomenon that the contact pressure increases in radially outward direction is considered to be largely responsible for said uneven wear of the lateral side faces and/or the sheaves as well as the local wear in case of the push-type drive belt. In the latter case, a decreasing contact pressure in radially outward direction constitutes an unstable configuration in which the transverse elements may tilt between the sheaves with respect to the radial direction, thereby mutually causing local wear on or in the vicinity of the projection and recess. A further disadvantage of such tilting is that is accompanied by slip between the sheaves and the transverse elements, whereby the efficiency of the CVT is reduced as a consequence. The invention is, therefore, particularly suited and intended for this type of flexible belt.

An alternative advantage of the CVT according to the invention is that the mutual orientation of the sheave faces of a pulley may be allowed to change slightly under the influence of the clamping force, without the pulley angle becoming disadvantageously larger than the belt angle. So, even when coping with a relatively high level of the clamping force that can occur in automotive applications, the pulleys of a CVT according to the invention need not necessarily be as rigidly designed as the known pulleys for automotive application. According to the invention, strengthening features of the pulley sheaves, such as radially oriented ribs, may therefore be reduced in size, or even omitted, yielding lighter and more cost effective pulley/ designs.

According to the invention the belt angle is preferably larger than the pulley angle by a value in the range from $1/30^{th}$ of a degree, i.e. 2 minutes, to $1/3^{rd}$ of a degree, i.e. 20 minutes. Such range was found to be suitable for typical automotive applications of the CVT. When the deviation between said angles is smaller than 2 minutes, the advantages of the invention are hardly noticeable, whereas when the deviation is larger than 20 minutes the disadvantage of the uneven distribution of the contact pressure mentioned in the above starts to take precedence over the advantages of the invention. It is still more preferred if the belt angle is larger than the pulley angle by a value in the range from $1/20^{th}$ of a degree to $1/6^{th}$ of a degree.

In an embodiment of the invention the belt angle is larger than the pulley angle by a value that substantially corresponds to the value of a maximum increase of the pulley angle during operation of the CVT. Normally, such maximum increase of the pulley angle occurs when both the clamping force and the radial position of the interaction are at a maximum. It may thus be achieved that the belt angle is at all times larger than, or equal to the pulley angle, resulting in a stable configuration of the flexible belt as discussed in the above. Since generally an axial deformation of the pulley sheaves is small compared to the radial dimension of the pulley sheaves, the maximum increase of the pulley angle may be approximated by the arctangent of the maximum axial deformation divided by the radial dimension of the sheaves.

In an alternative embodiment of the invention the belt angle is larger than the pulley angle by a value that substantially corresponds to halve the value of the maximum increase of the pulley angle during operation of the CVT. Although now situations occur wherein the belt angle is smaller than the pulley angle, it is advantageously achieved that the level of the contact pressure is lowered, since the maximum difference between the belt angle and the pulley angle is minimised. Dependent on parameters of the CVT, such as the magnitude of the increase of the pulley angle, the level of the contact pressure and/or the material and design of the flexible belt and the pulley, one or the other embodiment may be preferred.

In a further development of the invention the pulley angle of a pulley decreases in a radially outward direction along at least a substantial part of the radial dimension of the pulley sheaves. With this measure it is achieved that the axial deformation of the pulley sheaves can be compensated for, at least in a substantial part of a range of radial positions of the interaction. Thereby, it is advantageously achieved that the contact pressure between the pulley sheaves and the flexible belt is distributed more evenly. A relatively simple and cost effective manner for realising the measure according to the invention is found in providing at least one sheave face with a concave curvature as seen in tangential cross section of the sheave. For optimum results in typical automotive application of the CVT, the radius of the concave curvature has a value in a range from 5 to 100 meter. Such range being based on the preferred range of values for the difference between the pulley angle and the belt angle.

It is remarked that in EP-A-0.962.679 it is hypothesised that as a result of the flexible belt not being present between the sheaves of a pulley over their full circumference, the pulley angle both increases and decreases during operation depending on where said pulley-angle is measured on the circumference. Since during operation of the CVT a pulley rotates, it is not possible to compensate for such phenomenon by altering the belt angle or the pulley angle. However, according to the invention it is advantageous if the belt angle and the pulley angles are chosen such that during operation the belt angle is larger than the pulley angle, at least up to a preferred level of the clamping force, i.e. an amount of axial deformation of the pulley sheaves.

In an embodiment of the development of the invention, the pulley angle decreases in the radially outward direction, such that when during operation the clamping force is at a maximum, the belt angle substantially corresponds to the pulley angle, at least at an instantaneous radial position of the interaction between the lateral side faces of the flexible belt and the sheave faces of the pulley. In this manner it is achieved that during operation and at the radial position of the interaction belt angle is at all times equal to, or larger than, the pulley angle. To this end, the deformation of the sheaves, or, more accurately, an increase of the pulley angle as a result thereof, may be determined as a function of the radial position of the interaction when the clamping force is at a maximum.

In an alternative embodiment of the development of the invention, the pulley angle decreases in the radially outward direction, such that when during operation a clamping force is at a level that is the most frequently applied, the belt angle substantially corresponds to the pulley angle, at least at the instantaneous radial position of the interaction. In this manner it is achieved that during operation and at the radial position of the interaction the difference between the belt angle and the pulley angle is on average minimised.

In yet another alternative embodiment of the development of the invention, the pulley angle decreases in the radially outward direction, such that when during operation a clamping force is at an average level, the belt angle substantially corresponds to the pulley angle, at least at the instantaneous radial position of the interaction. In this manner it is achieved that during operation and at the radial position of the interaction the maximum difference between the belt angle and the pulley angle is minimised.

In an embodiment of the invention, the belt angle substantially corresponds to the pulley angle at a radially innermost position of the interaction between the lateral side faces and the sheave faces and is marginally, but notionally, larger than the pulley angle by a value in the range from $1/30^{th}$ of a degree to $1/3^{rd}$ of a degree at a radially outermost position of the interaction. Such range was found to be suitable for typical automotive applications of the CVT.

Moreover, the invention recognises that, depending on the design of a pulley construction, the deformation of the pulley sheaves may be more or less concentrated in a single sheave. For instance, an axially movable sheave that is supported radially outward by hydraulic movement means that are present for effecting the clamping force may deform considerably less than an axially fixed sheave that is not supported radially outward from the pulley shaft. To take account of this phenomenon, the interaction between the lateral side faces of the flexible belt and the sheaves faces of the pulley may be considered separately for each contact plane between a side face and a sheave face by defining a separate sheave angle for each sheave face of a pulley and by defining a separate face angle for each lateral side face of the flexible belt, whereby the sheave angles and the face angles are being defined with respect to an orthogonal of an rotational axis of the pulley. The respective sheave angle and/or the respective face angle than being adopted to account for the axial deformation of the respective pulley sheave in the manner disclosed in the above. As a result of this, the pulley angle and/or the belt angle becomes asymmetric with respect to an orthogonal of the rotational axis of the pulley shafts, i.e. a bisector of the belt angle or of the pulley angle is not oriented at a straight angle with respect to the axial direction.

The invention further relates to an endless flexible drive belt, in particular a push-type drive belt, intended for use in the continuously variable transmission according to the invention.

The invention also relates to an adjustable pulley intended for use in the continuously variable transmission according to the invention. In a preferred embodiment at least one sheave face is concave with an essentially constant radius of curvature as seen in tangential cross section of the pulley.

It is remarked that in WO-A-98/06961 a CVT is disclosed with pulleys having sheaves defining a pulley angle there between, whereby the pulley angle decreases in radially outward direction. The CVT comprises a number of independently operating thin endless rings. The aim of the disclosed invention is to achieve that during operation all rings operate at the same transmission ratio. When adopting this teaching to a typical CVT design for automotive application, the required decrease of the pulley angle in radially outward direction is far larger than that required for the present invention, which also has an entirely different aim. Moreover, because the rings are very thin in radial direction, they bend with relative ease to match the pulley angle. Therefore, the problem solved by the present invention does not occur in the known construction, at least not to the extend that the solution according to the present invention would have a particular advantage. In fact, the known rings do not have lateral side faces that are sufficiently planar for even determining a belt angle.

It is further remarked that the manufacturing tolerance applied on the belt angle and/or on the pulley angle may be of the same order of magnitude as the difference desired between said angle in accordance with the invention, which may in particular be the case when said difference is small. However, according to the invention it is advantageous if in such cases the nominal value of the belt angle is larger than the nominal pulley angle, whereby said nominal angles may be determined by taking the average value of such angle when measured at a number of positions along the circumference of the drive belt and the pulley respectively. In case of the push-type drive belt, said nominal belt angle may for instance be determined by the average value of the belt angle measured for each of the transverse elements.

BRIEF DESCRIPTION OF THE DRAWINGS

The invention will now be illustrated by way of example with reference to the figures.

FIG. 3 represents an example of a flexible belt.

FIGS. 4a and 4b represent a partial cross section of a pulley and a flexible belt according to the known art.

FIGS. 5a and 5b represent a partial cross section of a pulley and a flexible belt according to the invention.

DESCRIPTION OF THE PREFERRED EMBODIMENTS

Figure 1:
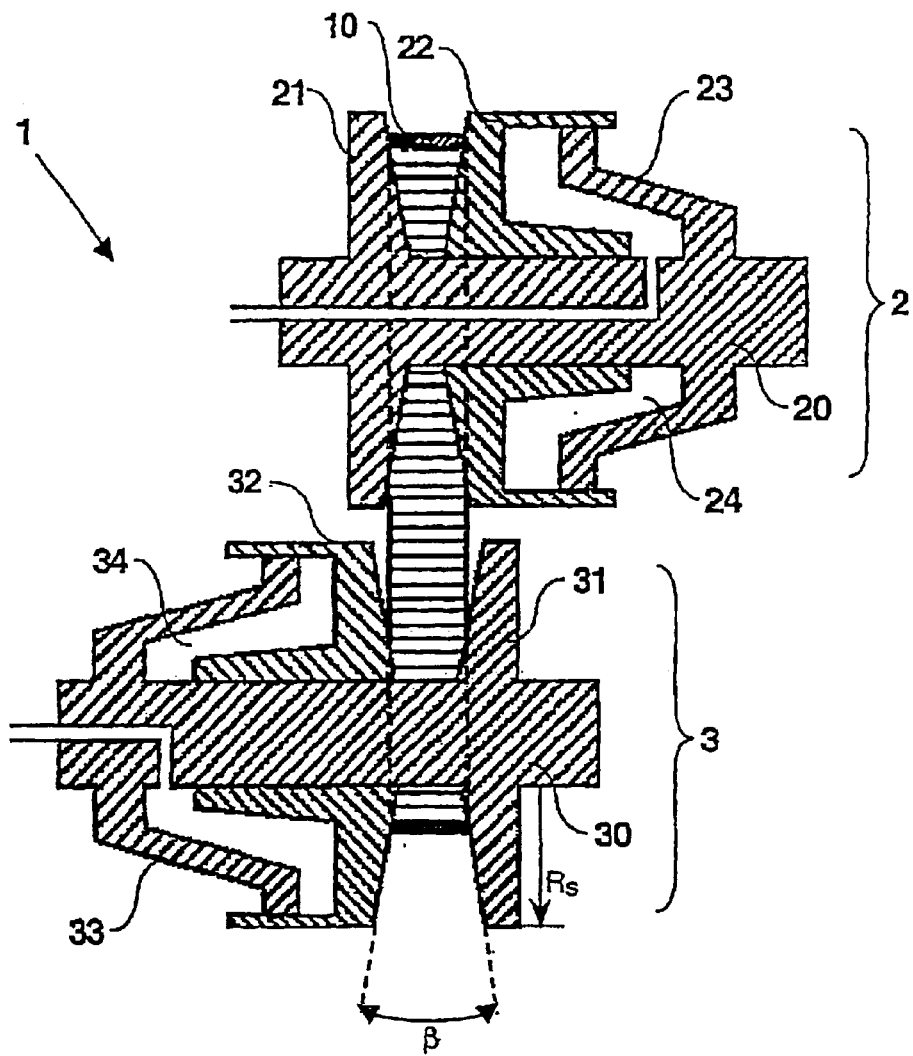
FIG. 1 is a schematically drawn cross section of a continuously variable transmission.

In FIG. 1 a CVT 1 according to the known art is shown. The CVT 1 comprises an input pulley 2 and an output pulley 3, each pulley 2; 3 comprising a set of two frusto-conical sheaves 21, 22; 31, 32 provided on an input pulley shaft 20 and on an output pulley shaft 30 respectively, and a flexible belt 10. The sheaves have a radial dimension $R_S$. The sheaves 21, 22; 31, 32 of a pulley 2; 3 may be urged towards each other under the influence of a hydraulic pressure exerted in a piston/cylinder assembly 23, 24; 33, 34 associated with the respective pulley 2; 3. As a result thereof, a clamping force $C_F$ is effected between the flexible belt 10 and the pulley sheaves 21, 22; 31, 32, of each of the pulleys, so that torque may be transmitted between said pulley 2; 3 by the belt 10 through friction.

Each sheave 21, 22, 31, 32 has a sheave face, whereby the sheave faces of a pulley 2; 3 are mutually oriented at a pulley angle β, as indicated in FIG. 1, such that they define an essentially V-shaped groove. The flexible belt 10 has lateral side faces for interaction with the sheaves faces of the pulleys 2; 3, whereby the lateral side faces are mutually oriented at a belt angle α, as indicated in FIG. 3 for a push-type drive belt by way of example, such that the flexible belt 10 is tapered in a radially inward direction. A sheave face and a lateral side face rest against each other in a contact plane that forms an acute contact angle with an orthogonal to the respective 11 pulley shaft 20; 30. In the known transmission both the belt angle α and the pulley angle β have a value that is essentially equal to twice that of the contact angle.

Figure 2:
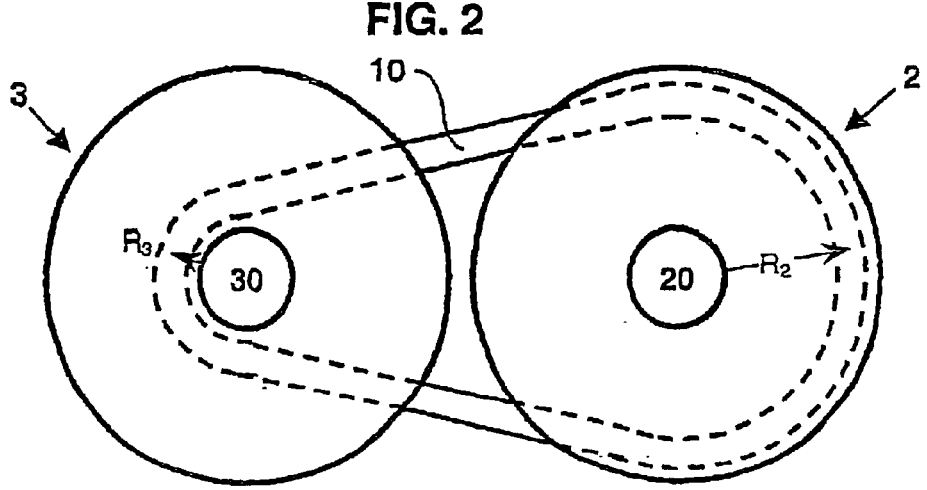
FIG. 2 is a view of the transmission of FIG. 1 shown in side elevation.

FIG. 2 is a simplified side elevation view of the CVT 1 of FIG. 1. In FIG. 2, as indeed also in FIG. 1, the flexible belt 10 has a radial position $R_2$ between the sheaves 21, 22 of the first pulley 20 that is considerably larger than a radial position $R_3$ of the flexible belt 10 between the sheaves 31, 32 of the second pulley 3. In this situation, a (torque) transmission ratio of the CVT 1 is smaller than 1, i.e. when power is transmitted from the input pulley shaft 20 to the output pulley shaft 30, a torque level is reduced. The clamping force $C_F$ for of each pulley 2; 3 may be such that a state of equilibrium arises, wherein the transmission ratio of the CVT 1 is fixed. Departing from such a state of equilibrium, the transmission ratio may be continuously variably changed by increasing or decreasing the clamping force $C_F$ for each pulley 2, 3, thereby changing the radial position $R_2$; $R_3$ of the flexible belt 10 between the sets of sheaves 21, 22; 31, 32.

FIG. 3 represents an example of a flexible belt 10, i.e. a push-type drive belt. An axial view of a bend section and of a stretched section of the drive belt 10 is shown. Furthermore a tangential view of the drive belt 10 is provided. The drive belt 10 comprises a number of transverse elements 11 that are contiguously and slideably mounted on a carrier 14, 15. In this example the carrier 14, 15 is composed of two sets 14; 15 of four radially stacked continuous bands. The transverse elements 11 are each provided with a projection 12 and with a recess 13, whereby the projection 12 of a transverse element 11 fits in the recess 13 of an adjacent transverse element 11. As is indicated in the figure, lateral side faces of the transverse element 11 are mutually oriented at a belt angle α, such that the flexible belt 10 tapers radially inward.

Figure 6A:
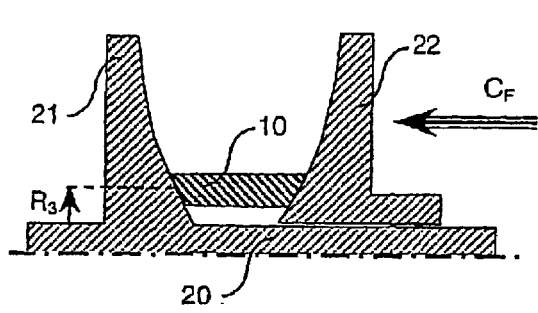
FIGS. 6a and 6b represent a further partial cross section of a pulley and a flexible belt according to the invention.
Figure 6B:
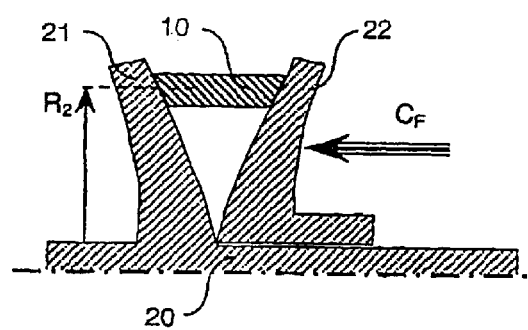

FIGS. 4A, 4B, 5A, 5B, 6A and 6B represent a schematic and partial cross section of a pulley 2 and a flexible belt 10. It is remarked that the deformation of the pulley sheaves 21, 22 as shown in the FIGS. 4B, 5B and 6B is exaggerated for the sake of clarity, as are the belt angle α, the pulley angle β and the differences there between. It is noted that, although in reality the axial deformation of the pulley sheaves 21, 22 is usually very small, it can be measured and appears to be the cause of an uneven wear of the lateral side faces and, in case of the push-type drive belt, of local wear at the location of the projection 12 and the recess 13.

In FIG. 4A a known configuration of the flexible belt 10 and the pulley 2 is shown. In such known configuration the belt angle α, the pulley angle β correspond. However, as is illustrated in FIG. 4B, with the application of a clamping force $C_F$ the sheaves 21, 22 of the pulley 2 deform, i.e. deflect mutually apart, whereby the pulley angle β increases. Thus, during operation the belt angle α will generally be smaller than the pulley angle β and the contact pressure between the flexible belt 10 and the pulley 2 will disadvantageously decrease in a radially outward direction.

In FIG. 5A the configuration of the flexible belt 10 and the pulley 2 according to the invention is shown. It can be seen that the belt angle α is larger than the pulley angle β. In practice the required difference between the angles α, β is very small, e.g. between 2 and 20 minutes depending on the amount of deformation of the pulley sheaves 21, 22 during operation of the CVT 1. In FIG. 5B it is shown that, with the application of a clamping force $C_F$, the pulley sheaves 21, 22 will deform, whereby the pulley angle β increases. At a defined level of the clamping force $C_F$, the deformation of the pulley sheaves is such that the belt angle α substantially corresponds to the pulley angle β. According to the invention the amount of deformation of the sheaves 21, 22 is dependent on the level of the clamping force $C_F$ as well as on the radial position $R_2$, $R_3$ of the interaction between the lateral side faces and the sheave faces, because the radial position $R_2$, $R_3$ determines the arm of the clamping force $C_F$. Therefore, the angles α, β will only correspond at defined combinations of the clamping force $C_F$ and of the radial position $R_2$, $R_3$. Additionally, at other possible combinations of the clamping force $C_F$ and the radial position $R_2$, $R_3$, the difference between the angles α,β is advantageously reduced in the CVT according to the invention, since the deformation of the pulley sheaves 21, 22 is compensated to a greater or lesser extend.

According to the invention the influence of the radial position $R_2$, $R_3$ of the interaction may be accounted for by a pulley 2 having a pulley angle that decreases 21, 22 in radially outward direction along the radial dimension $R_s$ of the pulley sheaves 21, 22, such as indicated in FIG. 5A. In FIG. 5A the radial position of the interaction is small, similar to the radial position $R_3$ indicated in FIGS. 1 and 2, consequently, the deformation of the pulley sheaves 21, 22 will also be small. At such small radial position $R_3$, the pulley angle β will thus substantially correspond to the belt angle α even with the application of a large the clamping force $C_F$. According to the invention, a small, if any, difference between the angles α, β is sufficient for compensating such deformation. In FIG. 5B the radial position of the interaction is large, similar to the radial position $R_3$ indicated in FIGS. 1 and 2. Consequently, with the application of the clamping force $C_F$, the deformation of the pulley sheaves 21, 22 is also relatively large, as is the increase of the pulley angle β as a result thereof. Thus for pre-compensating such increase, the initial pulley is set considerably smaller than the belt angle α.

According to the invention it is advantageous if the pulley angle beta gradually decreases in radially outward direction along the radial dimension of the pulley sheaves 21, 22, such that at a given level of the clamping force $C_F$ the angles α, β substantially correspond during operation of the CVT 1. The level of the clamping force $C_F$ may be selected freely, for instance in dependence on the type of application of the CVT 1. It is even possible to select such level in dependence on radial position $R_2$. $R_3$ of the interaction, e.g. for compensating the increase in pulley angle β resulting from that level of the clamping force that is the most frequently applied when the flexible belt 10 is positioned at such specific radial position $R_2$, $R_3$. In such case, the particular concave contour in radial direction of a sheave face may be different for the first pulley 2 and the second 3 pulley.

What is claimed is:

1. A continuously variable transmission, comprising:
   two adjustable pulleys,
   each of the adjustable pulleys comprising a pair of mutually displaceable essentially frusto-conical pulley sheaves having a radial dimension provided on a pulley shaft,
   each sheave having a sheave face, whereby the sheave faces of a pulley are mutually oriented at a pulley angle,
   an endless flexible belt for transmitting torque,
   the flexible belt provided with a number of transverse elements contiguously and slideably mounted on a carrier comprising at least one continuous band,
   the elements being provided with a projection for interaction with a recess of an adjacent element and comprising two lateral side faces, which side faces are mutually oriented at a belt angle such that the flexible belt tapers radially inwardly and which side faces are positioned for interacting with the sheave faces of a corresponding pulley under the influence of a clamping force to be exerted on the flexible belt by the sheaves,
   wherein, the belt angle is larger than the pulley angle by a value in the range from $1/30^{th}$ of a degree to $1/3^{rd}$ of a degree for at least a substantial part of the radial dimension of the pulley sheaves, and
   application of the clamping force causes the pulley angle of said at least one pulley to increase.

2. A continuously variable transmission according to claim 1, characterised in that the belt angle is larger than the pulley angle by a value that substantially corresponds to the value of a maximum increase of the pulley angle during operation of the CVT.

3. A continuously variable transmission according to claim 1, characterised in that the belt angle is larger than the pulley angle by a value that substantially corresponds to halve the value of a maximum increase of the pulley angle during operation of the CVT.

4. A continuously variable transmission according to claim 1, characterised in that the pulley angle decreases in a radially outward direction along at least a substantial part of the radial dimension of the pulley sheaves.

5. A continuously variable transmission according to claim 1, characterised in that the pulley angle decreases in a radially outward direction, such that when a clamping force is applied during operation of the CVT, the pulley angle substantially corresponds to the belt angle, at least at a radial position of interaction between the lateral side faces and the sheave faces, independently from the actual radial position of such interaction for a substantial part of the radial dimension of the sheaves.

6. A continuously variable transmission according to claim 5, characterised in that the clamping force is a maximum clamping force applied during operation of the CVT.

7. A continuously variable transmission according to claim 5, characterised in that the clamping force is a clamping force that is the most frequent applied during operation of the CVT.

8. A continuously variable transmission according to claim 5, characterised in that the clamping force is an average value of the clamping force applied during operation of the CVT.

9. A continuously variable transmission according to claim 1, characterised in that the belt angle substantially corresponds to the pulley angle at a radially innermost position of interaction between the lateral side faces and the sheave faces and in that the belt angle is larger than the said pulley angle by a value in the range from $1/30^{th}$ of a degree to $1/3^{rd}$ of a degree at a radially outermost position of the interaction.

10. A continuously variable transmission according to claim 1, characterised in that the belt angle is larger than the pulley angle by a value in the range from $1/20^{th}$ of a degree to $1/6^{th}$ of a degree at a radially innermost position of interaction between the lateral side faces and the sheave faces.

11. A continuously variable transmission according to claim 1, characterised in that the pulley angle of at least one pulley and/or the belt angle is asymmetrically with respect to an orthogonal of an axial direction of the pulley shafts.

12. A continuously variable transmission according to claim 1, characterised in that at least one sheave face is provided with a curvature having an essentially constant radius of curvature, such that the sheave face is concave as seen in tangential cross section.

13. A continuously variable transmission according to claim 12, characterised in that the radius of curvature of the sheave face has a value in a range from 5 to 100 meter.

14. Adjustable pulley intended for application in a continuously variable transmission according to claim 1, characterised in that a sheave face of the pulley is curved concave with an essentially constant radius of curvature as seen in tangential direction.

15. A motor vehicle continuously variable transmission, comprising:

two adjustable pulleys mounted on corresponding pulley shafts, each of the pulleys comprising a pair of mutually displaceable frusto-conical pulley sheaves having a radial dimension, each sheave having a sheave face with the sheave faces of a pulley mutually oriented at a pulley angle, an endless flexible push belt for transmitting torque comprising plural transverse elements contiguously and slideably mounted on a carrier, the carrier comprising at least one continuous band, the elements being provided with a projection for interaction with a recess of an adjacent element and comprising two lateral side faces, the side faces mutually oriented at a belt angle such that the belt tapers radially inwardly, the side face positioned for interacting with the sheave faces under the influence of a clamping force to be exerted on the flexible belt by the sheaves, wherein, the belt angle is larger than the pulley angle by a value in the range from $1/30^{th}$ of a degree to $1/3^{rd}$ of a degree for at least a substantial part of the radial dimension of the pulley sheaves, and application of the clamping force causes the pulley angle of said at least one pulley to increase.

16. The transmission of claim 15, wherein, the increase in the pulley angle is caused by a deformation of the sheaves of the pulley under influence of the clamping force, the clamping force providing a predominantly axially oriented reaction force exerted by the flexible belt on the sheaves at a radial position of interaction.

17. The transmission of claim 16, wherein, an amount of the deformation varies with a level of the clamping force causing the reaction force and on the radial position of the interaction, a thickness and a stiffness of the sheaves decrease in a radially outward direction, and the reaction force exerts a moment on a corresponding sheave with a moment arm dependent on the radial position of interaction.

18. A continuously variable transmission, comprising:

two pulley shafts, two adjustable pulleys, one of the two pulleys mounted on each of the two pulley shafts, each of the pulleys comprising a pair of mutually displaceable pulley sheaves having a radial dimension, each sheave having a sheave face with the sheave faces of each pulley mutually oriented at a pulley angle;

an endless flexible push belt for transmitting torque comprising plural transverse elements contiguously and slideably mounted on a continuous band carrier;

the elements each comprising two lateral side faces mutually oriented at a belt angle such that the belt tapers radially inwardly, the side faces positioned for interacting with the sheave faces under the influence of a clamping force to be exerted on the flexible belt by the sheaves, wherein, the belt angle is larger than the pulley angle by a value in the range from $1/30^{th}$ of a degree to $1/3^{rd}$ of a degree for at least a substantial part of the radial dimension of the pulley sheaves, and application of the clamping force causes the pulley angle of said at least one pulley to increase.

19. The transmission of claim 18, wherein, the increase in the pulley angle is caused by a deformation of the sheaves of the pulley under influence of the clamping force, and the clamping force provides a predominantly axially oriented reaction force exerted by the flexible belt on the sheaves at a radial position of interaction.

20. The transmission of claim 19, wherein, an amount of the deformation varies with a level of the clamping force causing the reaction force and on the radial position of the interaction.

* * * * *